United States Patent [19]

Shoesmith

[11] Patent Number: 5,030,491

[45] Date of Patent: Jul. 9, 1991

[54] SELF-ADHESIVE MOUNTING SURFACE

[76] Inventor: Michele L. Shoesmith, 1510 W. Hemlock St., Oxnard, Calif. 93035

[21] Appl. No.: 414,779

[22] Filed: Sep. 29, 1989

[51] Int. Cl.[5] .......................... B32B 3/10; B32B 7/14

[52] U.S. Cl. .......................................... 428/41; 428/43; 428/138

[58] Field of Search .................. 428/40, 41, 131, 138, 428/42, 43

[56] References Cited

U.S. PATENT DOCUMENTS

| | | | |
|---|---|---|---|
| 3,466,217 | 9/1969 | Mott | 428/40 X |
| 4,023,292 | 5/1977 | Shibata et al. | 428/40 X |
| 4,173,667 | 11/1979 | Rusch | 428/40 X |
| 4,284,275 | 8/1981 | Fletcher | 428/37 X |
| 4,386,135 | 5/1983 | Campbell et al. | 428/40 X |
| 4,627,994 | 12/1986 | Welsch | 428/41 |
| 4,925,716 | 5/1990 | Haas | 428/41 |

*Primary Examiner*—Henry F. Epstein
*Attorney, Agent, or Firm*—Klarquist, Sparkman, Campbell, Leigh & Whinston

[57] ABSTRACT

A surface which has adhesive available, upon the removal of a release liner, in order to affix objects including, but not limited to, fabric, paper, plastics, yarn, leather, glass and trims.

The mounting surface (10) is a heavy weight card stock paper, though it may be any material to which self-adhesives can be applied. The release liner (16), a material specially treated so as to be easily removed from the adhesive, covers the adhesive (18) until it is removed. The object to be mounted on the surface (22) is pressed down on the exposed adhesive, thus securing it to the mounting surface.

5 Claims, 2 Drawing Sheets

SELF-ADHESIVE MOUNTING SURFACE

FIELD OF THE INVENTION

This invention relates to the use of adhesives, specifically to an improved method of design, display, organization, or inventory, of items of many different materials including, but not limited to, fabrics, yarns, stationery, trims, notions, photographs, recipes and drawings.

BACKGROUND AND SUMMARY OF THE INVENTION

MOUNTING SURFACES FOR DISPLAY, ORGANIZATION OR INVENTORY

The mounting of samples or items for the purposes of display, organization, inventory, or for the purpose of design, has been accomplished by attaching the object to a stable surface by several different methods:

(a) the use of glues, glue sticks or adhesives.

(b) the use of hardware such as nails, screws, rivets or staples.

(c) the use of anchors such as snaps or hooks.

(d) the use of a method of tying the object to the stable surface which would require installation of an anchor to hold the tie.

(e) the alteration of a surface by the use of hardware such as a grommet that would allow the item to be mounted to be secured by method of tying.

(f) the design of the mounting surface to allow the item to be inserted in or wound around the surface.

(g) the use of loop and hook closures on both the mounting surface and the object to be mounted.

(h) the use of a magnetic material on both the mounting surface and the object to be mounted.

The disadvantages of the above methods are:

(a) in addition to the item to be mounted, a secondary process or product must be acquired and put to use in order to secure the sample or item to the desired surface.

(b) certain skills may be required to institute the use of the secondary process or product.

(c) some of the above methods for securing the sample are expensive to acquire and implement.

(d) the user must have the required process or product handy at the time the sample is to be secured.

PRODUCTS AVAILABLE FOR ORGANIZATION, DISPLAY, INVENTORY AND DESIGN

One type of product available is an organizer designed specifically for fabric samples. The fabric book requires the use of a secondary product in the form of a glue or glue stick in order to secure the fabric sample in place. Three such examples of this type of product are WHERE DID YOU BUY THAT FABRIC? published by The Quiet Quilt, Garden Grove, CA, the KEEP IT SIMPLE TM SEWING ORGANIZER PLANNER and the KEEP IT SIMPLE TM CRAFT ORGANIZER PLANNER both published by Er-Sel Enterprises, Woodstock, Il.

These products have the disadvantages of:

(a) requiring a secondary process or product be put use in order to secure the sample or item to the mounting surface.

(b) the user must have the required process or product handy at the time the sample is to be mounted.

Also on the market is a type of organizer developed for photographs that requires the use of a plastic sleeve in which to place the photograph. There are many companies that produce organizers using this plastic sleeve. Another common use of this product is as a carrier for identification and credit cards. When used with photographs, identification and credit cards, the sleeve has the great advantage of allowing the user to remove and replace this item at will.

The above mentioned type of sleeve has been used by the Hold That Thought! Co. in their product titled simply, SWATCH BOOK. The SWATCH BOOK is an organizer in a looseleaf binder in which to place fabric, yarn and trim samples as well as a card with a description of the sample including basic information about quantity on hand, type, etc. The disadvantages of this type of system are:

(a) the use of a carrier requires that the sample be placed inside the sleeve. This is not easy to accomplish with all types of papers, plastics, fabrics and trims.

(b) the carrier takes up space within the container holding the collection of samples. Use of the carrier requires considerably more space than the same number of samples would without the carrier.

(c) the samples must be removed from the carrier in order to read the description card.

(d) the other option to item (c) is to place the description card facing the opposite direction as the face of the sample it describes. This would then require that the user flip the carrier back and forth in order to look at the sample and read the information contained on the description card.

(e) this system requires the use of an additional product, (glue, staples or transparent tape) with which to attach the fabric, yarn, trim, etc., to the description card.

(f) the use of a carrier limits the item to be organized, inventoried, or displayed to the size and shape of the sleeve.

(g) this type of product cannot be used as a surface upon which to design or create art.

PRESSURE SENSITIVE ADHESIVES

The technology to produce a self-adhesive product which can be applied to a surface to await later use has been available since the mid 1940's. The adhesive is covered and protected by a specially treated release liner which can be easily removed at the time of use. This adhesive is commonly used to adhere a material to itself, as in the closure of an envelope. Another way in which this type of adhesive is used is to apply it to a material that you may later wish to mount on another surface which would not, by its nature, be used as a mounting surface. An example of this would be the application of the adhesive to a price sheet or sticker.

There are many different forms of adhesive available which employ the basic concept stated above. These products are referred to generically as pressure sensitive adhesives.

There are two different basic manufacturing processes for pressure sensitive adhesive. These differences impact the way in which a product incorporating these adhesives is manufactured.

One of the above types of adhesive requires an additional manufacturing step. The release liner is brought in contact with the adhesive after the adhesive has been applied to the end product. This type of product is referred to as peel and stick.

The second type of adhesive is manufactured directly on the release liner which is later applied as a single step in the manufacture of an end product. This type of product is referred to as a transfer tape.

PEEL AND STICK ADHESIVE

Peel and stick adhesives offer the advantage of the ability to be applied to a contiguous area which is greater than one inch square. However, the use of this type of adhesive, when it is to be applied to selected areas of a surface rather than its entirety, has several disadvantages:

(a) the cost of manufacture is greater than that of other technologies, because of the required additional step of placing the release liner over the adhesive after the adhesive has been applied to the end product.

(b) this type of adhesive is not suitable for short production runs. In fact, it does not become economical until the number of units to be manufactured in a single production run approaches 1,000,000 (one million).

(c) the manufacturing process does not produce a consistent and accurate positioning of the adhesive and release liner. This degrades the appearance of the end product.

(d) this type of adhesive is unsuitable in applications requiring precise positioning of the adhesive and release liner in order to produce a properly functioning product.

TRANSFER TAPE

Transfer tape is generally available in rolls of various widths up to one inch. It is applied to a surface in strips of varying lengths. Although it may be obtained in widths greater than one inch, it is not designed to cover an entire surface area. Transfer tape has several distinct advantages when adhesive must be applied on selected areas of a surface rather than its entirety:

(a) the use of this tape eliminates an extra step in the manufacturing process, thus reducing the cost of the end product.

(b) the setup cost for the application of tape is not dependent on the length of the production run, but rather on the complexity of the application. Thus, a short production run of just a few thousand items is feasible.

(c) the consistent and accurate positioning of the tape is easy to accomplish. This translates to an excellent finished appearance for the end product.

(d) the use of tape is desirable in applications requiring precise positioning of the adhesive and release liner in order to produce a properly functioning product.

DOUBLE-COATED TAPE

Not to be confused with transfer tape is a type of product called double-coated tape. A double-coated tape is one in which a carrier is coated on both sides with adhesive and then is put on a release liner. This product appears to be the same as a transfer tape. It is applied in the same manner as transfer tape.

Double-coated tape has the same advantages and disadvantages as does transfer tape. It has the additional advantages of:

(a) the use of a carrier provides greater stability than with other adhesives.

(b) the use of a carrier provides greater bonding strength than with other adhesives.

One additional disadvantage is that the cost is higher due to the use of the carrier and the extra manufacturing step required to place the adhesive coated carrier on the release liner.

PRODUCTS USING PRESSURE SENSITIVE ADHESIVES

To outline, pressure sensitive adhesives are commonly used:

(a) to adhere a material to itself as in the sealing of an envelope.

(b) to adhere a price sheet or sticker to another surface.

(c) in the manufacture of business forms, to adhere one to another. This is essentially the same application as in (b) above.

(d) to apply to the product or the packaging of a product, allowing it to be mounted on another surface such as point of purchase display.

(e) to apply to a sign or other similar media, allowing it to be mounted to another surface such as a wall or window.

A product for mounting and framing needlework, called SELF-STICK ART NEEDLEWORK MOUNTING BOARD, is available from Pres-On Products, Inc., Addison, Ill. This product is designed to be a support for needlework to be mounted in a picture frame. This product consists of a piece of rigid chipboard with a peel and stick type adhesive covering the entire surface. The adhesive is not intended to bond permanently to the object being mounted upon it, but rather to allow the piece of needlework to be later removed for cleaning.

This product has several disadvantages for use as a surface for display, organization, inventory or design. These are:

(a) the entire surface of the product is covered with adhesive, allowing no space for the user to record information about the item being placed on the mounting surface.

(b) the entire surface of the product is covered with adhesive, making it impractical to place several different items on the mounting surface. Sticky adhesive could be left exposed between the items. Additionally, the surface between items would not be usable to record information.

(c) this product is not intended to provide permanent adhesion.

(d) because the adhesive used is not permanent, the product would not show evidence of tampering.

(e) the chipboard upon which the adhesive is supplied is heavy and bulky.

(f) the weight and bulk of the product make it impractical in a situation requiring large surface area or multiple pages.

(g) the weight and bulk of the product make it impractical to be stored in a compact, easily transportable form.

(h) the adhesive covered surface makes it impractical to provide a printed, colored or textured background surface upon which to mount. This does not provide a practical base for display or design of art, signs, posters, photos, etc.

Another type of product, widely available since the mid-1960's, was developed for photograph albums. It uses a weak, non-permanent adhesive in parallel strips approximately 1/32" wide which are spaced approximately 1/16" apart. These strips prevent the photo from moving laterally on the page. A clear sheet of acetate or similar material covers the photo, actually holding it the page in the organizer.

While this product had advantages over the previous methods of securing photographs, it suffers the same disadvantages mentioned in the needlework mounting board above. Additionally:

(a) this product requires a cover sheet to hold the photo in place.

(b) the sheet covering the photos is subject to damage with use and age.

(c) the adhesive areas not covered with photos turn yellow with age, thus degrading the appearance of the final product.

In the above presented applications, we have seen that, for the most part, the pressure sensitive adhesive is applied to the object that is to be mounted on another surface. The exceptions are:

(a) a mounting board for needlework which is completely covered with the adhesive. The disadvantages of which have been thoroughly discussed above.

(b) a photograph album using parallel strips of a weak nonpermanent adhesive to prevent lateral movement of the photo. This product additionally must use a cover sheet to ACTUALLY hold the photo in place on the mounting surface. Further disadvantages were covered in the previous detailed descriptions of the needlework mounting board and the photo album.

(c) an envelope using adhesive applied to a material which is then folded over, sealing the material to itself.

In the other examples cited, the pressure sensitive adhesive has been applied to the item to be mounted on another surface. This has several disadvantages:

(a) the automatic application of adhesive to many different individual items of varying sizes, shapes and materials is not impractical to implement.

(b) the manual or automatic application of the adhesive to individual items of varying sizes, shapes and materials requires the user to implement a secondary process in order to mount the desired item.

(c) application of the adhesive requires an understanding of the technology of specialized application equipment, and skill in its use.

(d) applying the adhesive to the individual item does not provide a surface upon which the item may be mounted.

(e) applying the adhesive to the individual item does not provide a surface upon which information may be recorded.

(f) applying the adhesive to the individual item does not provide a structure within which the items may be organized and presented in a logical manner.

(g) applying the adhesive to each individual item to be mounted requires an excess expenditure of time and effort over other methods.

THE SELF ADHESIVE MOUNTING SURFACE

The implementation of a self-adhesive mounting surface approaches the problem of attaching objects to a mounting surface from another direction. Rather than apply adhesive to the object to be mounted, we apply adhesive to a mounting surface. The end user then mounts the desired item on the adhesive covered mounting surface.

Using this method, many different types of items (fabric, paper, yarn, leather, glass, and trims, etc.) may be attached to a mounting surface for purposes of organization, display, inventory or design.

The adhesive may be applied to paper, glass, mylar, acetate or any other surface to which it will adhere. The limiting factor in determining usable surface is the technology available at the present time to actually apply the adhesive to an object or surface. Accordingly, items may also be attached to each other when the item is at once a mounting surface and an item to be mounted.

The adhesive may be applied to the mounting surface in any format suitable to the use of the end user. Thus, we can create many different types of organizers, design tools, catalogs, placards and display surfaces.

The mounting surface may be printed with a format suitable for storage of information, decorative design, or descriptive information. These being merely suggestions, the possibilities are not limited to those stated here.

Accordingly, the objects and advantages of my invention are:

(a) the use of a secondary process or product in addition to the product of my invention is not required.

(b) a cost savings is realized in that a secondary product or process does not have to be implemented.

(c) with a basic underlying structure already in place, organizing, keeping an inventory, displaying items, and cataloging becomes a simple task that any individual of average skill or intelligence can accomplish.

(d) to provide a savings of time required to organize or inventory a collection of items.

(e) to provide a savings of time required to create a design or display of a item, or collection of items.

(f) a cost savings is realized by the use of a device to present information regarding the current inventory of stock represented by the items.

(g) to provide the presentation of a visual inventory in a compact, easily transportable product.

(h) to allow for ease of use.

(i) to provide a way of securing several hundred items in place with minimum time and effort.

(j) to provide a surface upon which the user may record information about the item being displayed.

(k) to allow the use of a printed, colored and/or textured surface upon which the user may mount an item.

(l) to provide a self-adhesive surface which the user may alter in any way he/she deems artistic to meet the purpose of display or design.

LIST OF REFERENCE NUMERALS

Figure 1:
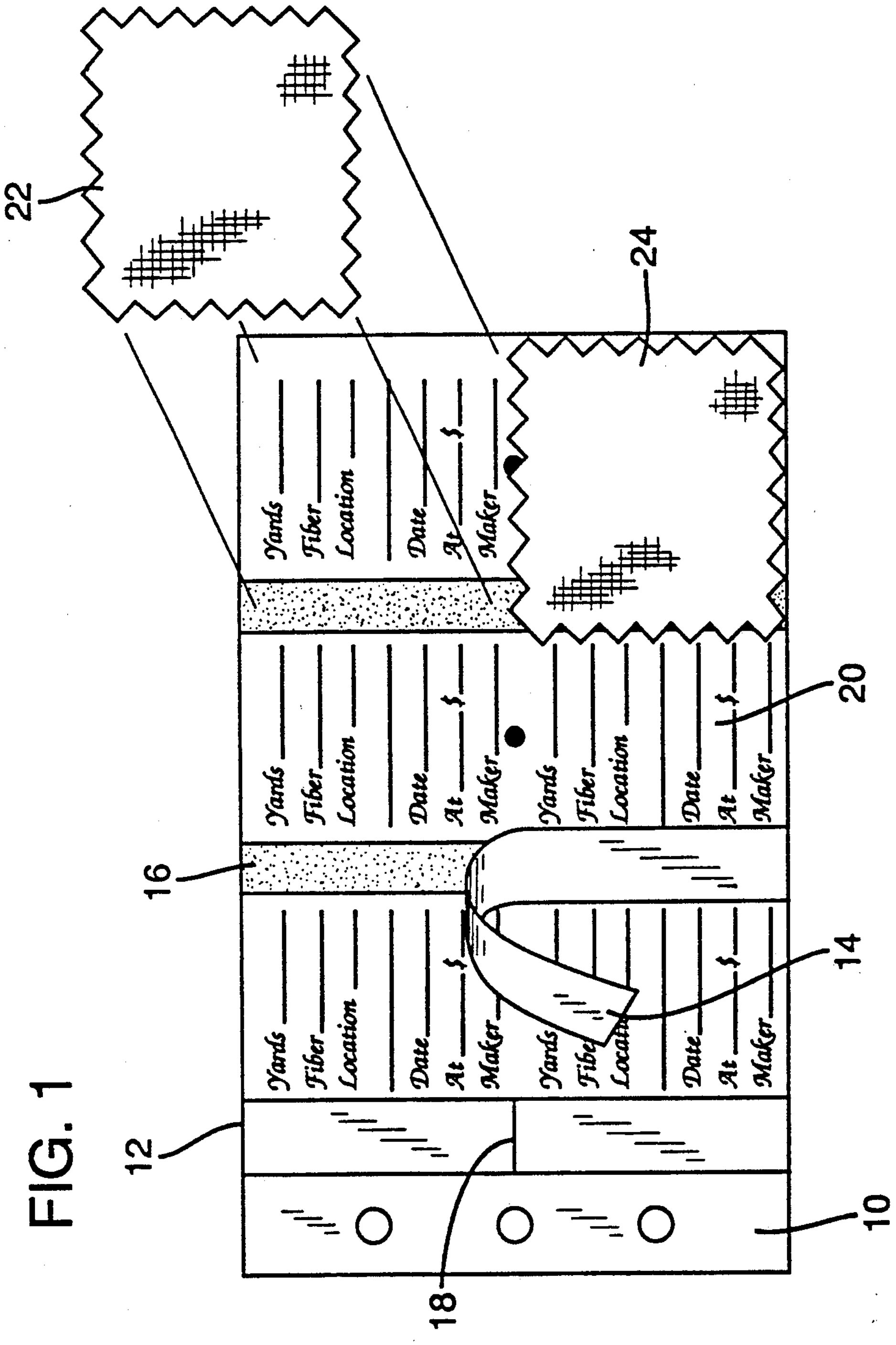
FIG. 1 is a typical plan view of my invention. This illustration is a SwatchCard TM from my product the QuilterSwatchbook TM.

10: mounting surface
12: self-adhesive strip
14: release liner
16: adhesive
18: kiss cut
20: data recording area
22: item to be mounted (fabric sample)
24: mounted item (fabric sample).

DESCRIPTION OF INVENTION

Figure 2:
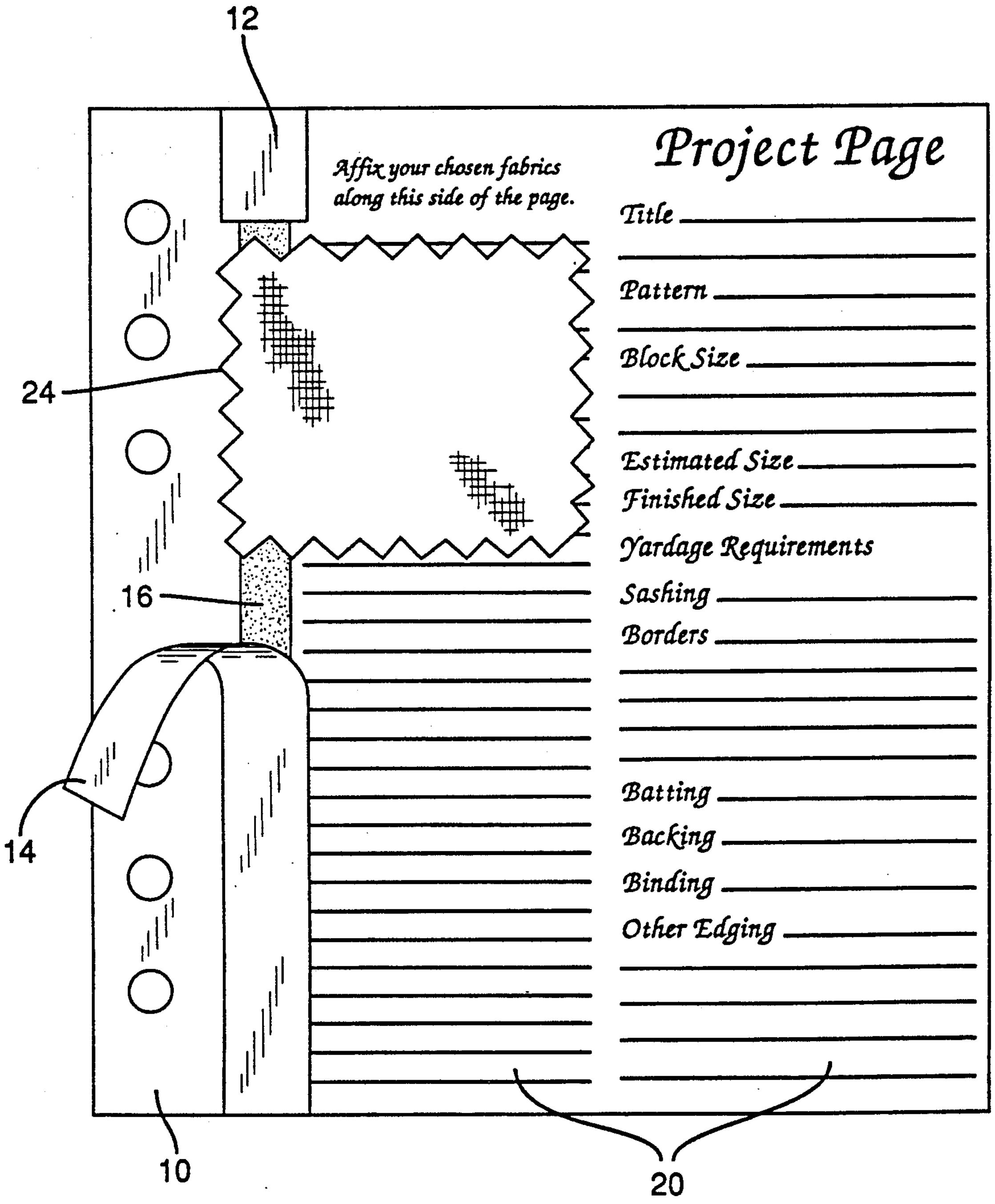
FIG. 2 is another typical plan view of my invention. This illustration is a ProjectCard TM, an add-on product to the QuilterSwatchbook. The back of this card is printed with a square grid of lines to aid in sketching.

Though FIGS. 1 and 2 show specific formats, my invention is not limited to the formats or uses illustrated here. The invention comprises the following:

(a) the mounting surface 10 is the material upon which the self-adhesive strip 12 is applied.

(b) the self-adhesive strip 12 is comprised of a release liner 14 and underlying adhesive 16.

(c) a kiss-cut 18 is a cut that goes through the release liner 14 but not the mounting surface 10 allowing the release liner to be removed in sections, thus protecting the unused adhesive 16 for a future use.

(d) the recording area 20 is a portion of the mounting surface 10 which may be used to record information about the item being mounted 22, in this case, a fabric sample.

(e) the reverse side of the mounting surface 10 may be imprinted with information, drawings, grids, etc. In the example illustrated in FIG. 3, the reverse side of the mounting surface 10 has been imprinted with a grid 26.

Typical embodiments of the self-adhesive mounting surface of this invention are illustrated in FIGS. 1 and 2. Though these figures illustrate very specifically a particular format, I do not wish to imply here that these examples are the only way in which my invention can be designed.

The item illustrated in FIG. 1 is a SwatchCard TM from the QuilterSwatchbook TM, just one of many types of products in which the self-adhesive mounting surface may be incorporated. The QuilterSwatchbook is a fabric organizer designed to hold many hundreds of fabric samples. Other formats have been developed as illustrated in FIG. 2, showing a ProjectCard TM, an add-on item to the QuilterSwatchbook. Additional formats for this product line may include an area designated to mount a photo, finished sample, or an envelope to contain loose items.

The use of the self-adhesive mounting surface distinguishes these products from all other organizers on the market today. The advantages of incorporating the self-adhesive mounting surface in this type of product are:

(a) the use of a secondary process or product in addition to the product of my invention is not required.

(b) with a basic underlying structure already in place, organizing, keeping an inventory, displaying items, and cataloging becomes a simple task that any individual of average skill or intelligence can accomplish.

(c) a time savings is realized by mounting of the fabric samples in this manner over the time required by other technologies.

In the preferred embodiment, the above mentioned mounting surface is based on the use of the adhesive product referred to as transfer tape. It is available from many sources, one being Tape Service, Ltd., Pico Rivera, CA.

The advantages of transfer tape include:

(a) the use of this tape eliminates an extra step in the manufacturing process, thus reducing the cost of the end product.

(b) the setup cost for the application of tape is not dependent on the length of the production run but rather on the complexity of the application. Thus, a short production run of just a few thousand items is feasible.

(c) the consistent and accurate positioning of the tape is easy to accomplish. This translates to an excellent finished appearance for the end product.

(d) the use of tape is desirable in applications requiring precise positioning of the adhesive and release liner in order to produce a properly functioning product.

However, the adhesive product can consist of any type of adhesive which seems to the end user to be usable by simply peeling back a release liner to expose the sticky area for the object to be mounted.

OTHER FORMS OF USE

The self-adhesive mounting surface may also be used to hold business cards on a mounting surface which can be stored in a receptacle. A popular telephone filing system uses a specially shaped card which resides in a custom designed receptacle. If the self-adhesive mounting surface were to be configured to fit this receptacle, the ROLODEX TM filing system, manufactured by Zephyr American Corporation, Secaucus, NJ, could be improved to allow direct mounting of business cards.

Additional embodiments of the self-adhesive mounting system may also include, but are not limited to, photo albums, scrap books, project diaries, do-it-yourself posters, calendars, design boards and recipe organizers.

The adhesive may be applied to paper, glass, mylar, acetate or any other surface to which it will adhere. The limiting factor to determine usable surface is the technology available at the present time to actually apply the adhesive to an object or surface.

Another option for implementation of the self-adhesive mounting surface would be the use of an adhesive that is inert unless activated by the user in a manner including, but not limited to, the application of heat or moisture.

The use of a peel and stick adhesive which covers the entire mounting surface could be implemented with the addition of a release liner having a surface suitable to accept inks, paints or even other adhesives. The release liner can be formatted in any desired manner. When cut, the release liner may be removed in any shape or amount desired, thus exposing the adhesive covered mounting surface in specific areas only.

OPERATION OF INVENTION

FUNCTIONS OF THE INVENTION COMPONENTS

1. The function of the mounting surface is to provide a surface upon which:
   (a) the adhesive may be applied.
   (b) the item may be mounted.
   (c) information may be recorded.
   (d) the user may alter in any way he/she deems useful, necessary or artistic.
2. The function of the adhesive is to simultaneously adhere to both the mounting surface and the item to be mounted.
3. The function of the release liner is:
   (a) to cover and protect the adhesive until time of use.
   (b) to be easily removed from the adhesive at time of use.
4. The function of the kiss-cut is to allow the release liner to be removed in sections. This preserves the functionality of the release liner in unused sections of the mounting surface.

5. The function of the recording area is to provide a place for information the user may wish to keep with the item mounted on the self-adhesive mounting surface.

MANNER OF USE

The manner of using the self-adhesive mounting surface is simple and straightforward:

(a) Select the object to be mounted for purpose of organization, display, inventory or design.

(b) Prepare the object for mounting. That is reduce to the desired size, shape, or perform any other preparation the user may envision in order to obtain the desired effect or result.

(c) Remove the release liner covering the adhesive by prying up the edge of the release liner with a fingernail or other device and pulling it away from the surface of the adhesive. The release liner may then be discarded.

(d) Press the object to be mounted onto the exposed adhesive.

Conclusion, Ramifications and Scope of Invention

In any situation where it would be prohibitively expensive to implement a pictorial catalog, there exists a need for an organizational tool designed to hold samples or items. It must provide transportability, flexibility, great capacity, and ease of use. A product of this type would be especially useful for small businesses.

Additionally, there will be improvements to many situations in everyday life. New products can be developed that will assist in the organization of collections, photos, memories, recipes, and projects. Design tools can be produced that will allow an individual with limited skill to produce posters, signs, name tags and many other items once thought limited to those individuals possessing artistic and creative skills. Calendars, indexes, time organizers, expense diaries, and bulletin boards making use of this technology will simplify household record keeping.

Products produced using the self-adhesive mounting surface will have distinct advantages over prior parallel products:

(a) they will be self contained. The product will not require the purchase of a secondary product or process in order to be put to use.

(b) a cost savings is realized because a secondary product or process does not have to be implemented.

(c) the products will not require any special skill in order to be put to use.

(d) a time savings is realized over the use of other mounting surfaces or methods.

(e) the products will be convenient to use and maintain.

(f) the products will be conveniently sized and therefore easily transportable.

(g) the ultimate capacity for storage will be large enough to meet the needs of the majority of users.

(h) the products will allow the user freedom to alter the face of the mounting surface for the purposes of artistic expression or communication.

Although the description above contains many specificities, these should not be construed as limiting the scope of the invention but merely as providing illustrations of some of the presently preferred embodiments thereof.

Thus the scope of the invention should be determined by the appended claims and their legal equivalents, rather than by the examples given above.

I claim:

1. A loose-leaf page comprising:

a substrate defining first and second surfaces, the first surface having a marginal mounting portion defining holes by which the substrate may be mounted, and also having a non-mounting portion;

a pressure sensitive adhesive disposed on the substrate;

a release liner disposed over the pressure sensitive adhesive;

the release liner including at least one incision therethrough to facilitate removal of part of the liner from the adhesive without removing all of the liner;

said adhesive being disposed over some but less than all of the non-mounting portion to thereby define, in the portion over which the adhesive is not disposed, a region on the substrate on which indicia relating to an article mounted to the adhesive can be written, such as by a pen or pencil.

2. The loose-leaf page of claim 1 which further includes a textile article adhered to a portion of the pressure sensitive adhesive from which the release liner has been removed.

3. The loose-leaf page of claim 1 in which the substrate is printed, in the region over which the adhesive is not disposed, with a plurality of different topical headings adjacent which a user may write data relating thereto.

4. The loose-leaf page of claim 3 in which the topical headings are designed to facilitate organization of a collection of textile materials.

5. The loose-leaf page of claim 4 in which one of the topical headings printed on the substrate solicits the user to write data relating to a location at which a supply of a textile material may be found.

* * * * *